UNITED STATES PATENT OFFICE.

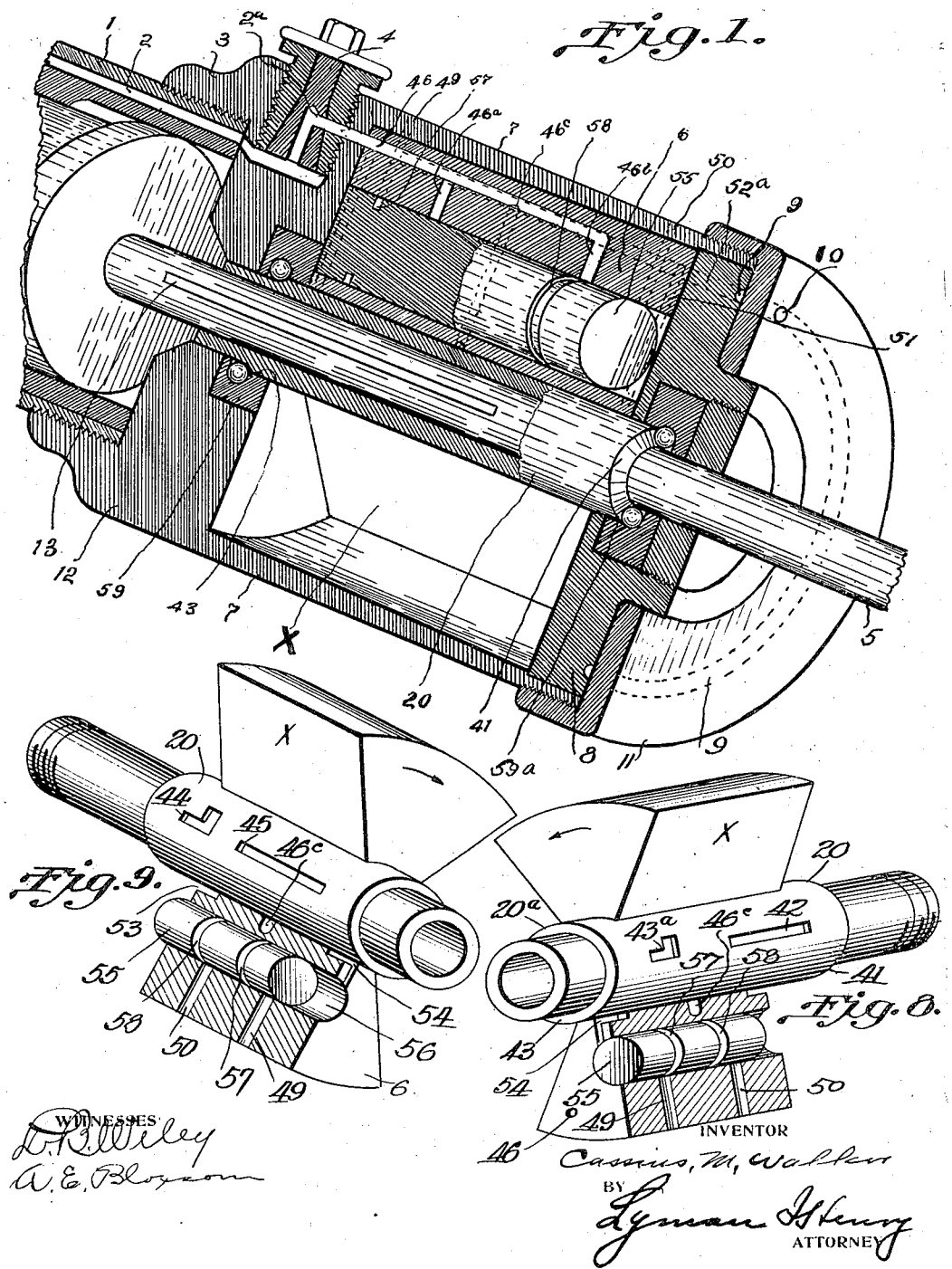

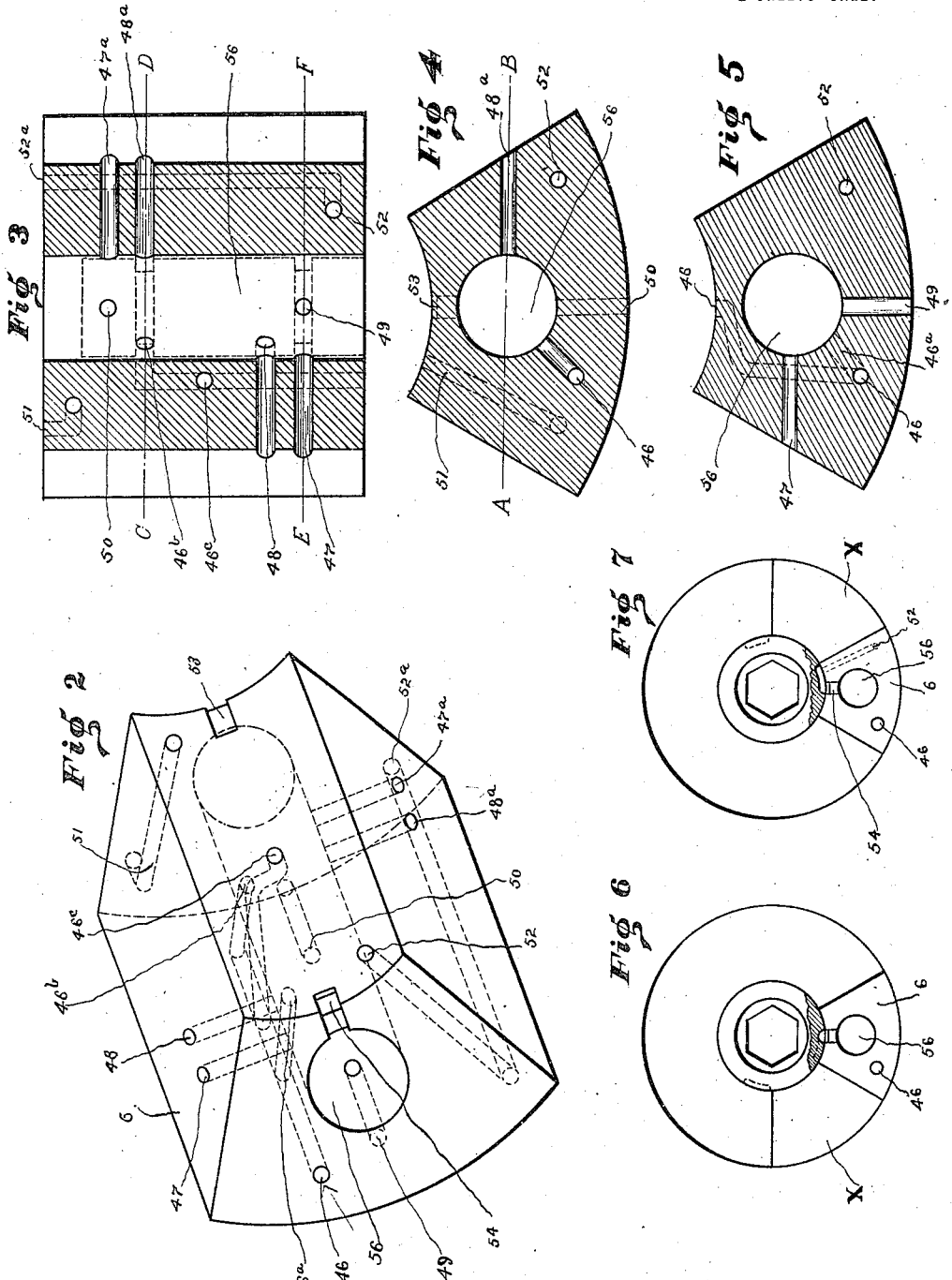

CASSIUS M. WALKER, OF PUEBLO, COLORADO, ASSIGNOR TO THE WALKER-MOORE ROCK DRILL MANUFACTURING AND SUPPLY COMPANY, A CORPORATION OF COLORADO.

OSCILLATING ENGINE.

1,145,449.   Specification of Letters Patent.   Patented July 6, 1915.

Application filed October 13, 1908. Serial No. 457,494.

*To all whom it may concern:*

Be it known that I, CASSIUS M. WALKER, a citizen of the United States, residing at Pueblo, in the county of Pueblo and State of Colorado, have invented a certain new and useful Improvement in Oscillating Engines, of which the following is a specification.

My invention relates to improvements in oscillating engines and the objects of my invention are to provide an engine that alternates in rotation without any exterior adjustments; to provide an engine of the character mentioned to operate under continuous fluid under pressure as distinguished from throttled feed; and other objects that will appear from the specifications. I attain these objects by the mechanisms illustrated in the accompanying drawings, in which,—

Figure 1 is a longitudinal perpendicular sectional view of the device in perspective with some of the included parts in broken section; Fig. 2 is a perspective view of the abutment showing included ports in dotted lines; Fig. 3 is a part plan and part longitudinal sectional view of the abutment at line A—B of Fig. 4; Fig. 4 is a cross sectional view of Fig. 3 at line C—D; Fig. 5 is a cross sectional view of Fig. 3 at line E—F; Fig. 6 is a plan view of the end of the rotating engine with partly broken sections, showing the relative positions of the rotator valve piece and the piston at one limit of its motion; Fig. 7 is the same as Fig. 6 except that the piston is at the opposite limit of its movement; Fig. 8 is a perspective view of the rotating piston with the hollow piston shaft, and longitudinal cross sectional view of the rotator valve piece with the contained piston valve in perspective in one direction of the piston movement; and Fig. 9 is the same as Fig. 8 save and except the opposite motion of the piston is shown and the opposite side of the abutment in section.

Similar numerals refer to similar parts throughout the several views.

The attachment 1 may be of any form desired, to which the device may be fixed. In this attachment 1 is a conduit 2 through which is conveyed fluid under pressure to the conduit $2^a$ included in the device. The screw threaded extension 3 provides means of fixing the device to the desired attachment. The containing cylinder 7 is constructed with a breech 12. A cap 11 is screw threaded on the exterior end of the cylinder 7 and holds in position the cylinder head 8. The ball bearing races 59 and $59^a$ are provided to assist in reducing friction. A wing piston X, attached rigidly to the hollow piston shaft 20, fits the interior ends of the cylinder 7 and is so disposed as to bear upon the interior sides of the cylinder 7. The hollow piston shaft 20 is provided with shoulders 41 and 43 to rest upon balls in the ball bearing races 59 and $59^a$, and at the same time to fit closely in the bearings in the breach 12 and head 8 of the cylinder. The hollow piston shaft 20 is also provided with two sets of ports in the circumference thereof, a rectangular and a right angled port in each set, one set numbered 42 and $43^a$, and the other set numbered 44 and 45. A working shaft 5 is provided with a slot 13 to keyseat the working shaft on the interior of the hollow piston shaft 20 and thereby connect the device with operating mechanism.

An abutment 6 is provided with a system of ports as follows:—Port 46 connects with port $2^a$ and extends longitudinally into the abutment 6 having two branches, $46^a$ and $46^b$, connecting with the interior of the valve chamber 56, and another branch $46^c$ passing around the valve chamber 56 and connecting with the interior concave face of the abutment 6; two parallel ports, 47 and 48, near to the breech connecting one face of the abutment 6 with the chamber 56; two parallel ports, $47^a$ and $48^a$, near the front end or head connecting the other face of the abutment 6 with the valve chamber 56; two radiating ports 49 and 50 connecting the valve chamber 56 through the abutment 6 with the open air; a port 52 extending radially from the concave inner face of the abutment 6 near to the outer portion of the abutment 6, connecting with the horizontal port $52^a$ to the open air. The port 51 extends radially from the concave inner face of the abutment 6, near to the outer portion of the valve and thence horizontally to the open air. There is also added at each end of the abutment 6 the slotted ports 53 and 54 which extend from the concave face of the abutment 6 at each end up to the valve chamber 56.

A piston valve 55 fits in the valve chamber 56 and is shorter than the chamber. This piston valve has two annular ports 57 and 58 thereon.

In the cylinder head 8 I have provided an annular channel 9 with the port 10 through the cap 11 to the open air. This is done to make connection for ports 52$^a$ and 51 to the open air. A throttle valve 4 is provided to regulate the amount of the fluid under pressure through the port 2$^a$.

The device being assembled and the wing piston X being in position as shown in Fig. 7, fluid under pressure is supplied, through the port 2$^a$, controlled by throttle 4, and by that means is turned into the port 46. The piston valve 55 being in the position shown in Fig. 8, the port 46$^a$ is closed and the port 46$^b$ is open to the grooved port 58 in the piston valve 55 and the port 48$^a$ is in alinement also with said grooved port 58. Thus the fluid under pressure passes through ports 46, 46$^b$, grooved port 58, and port 48$^a$ and is expended against the wing X driving it in the direction indicated in Fig. 8, until said wing piston X has reached the opposite side of the abutment 6 resting thereon as shown in Fig. 6; and it will be noted that the fluid under pressure is applied directly against the wing piston throughout the movement and does not depend on expansion. While this movement of the wing piston X is taking place from right to left as shown, the grooved port 57 of the piston valve 55 is in alinement with the port 47 and also in alinement with the port 49 that extends through the abutment 6 and casing of the cylinder to the open air, thus constituting a continuous exhaust while the wing piston is moving in the direction last above stated. At the instant that the wing piston X has completed the movement from right to left, the port 46$^c$, always connected with the supply of fluid under pressure, comes into alinement with the rectangular slotted port 45, and said slotted port 45 is also connected with the slotted port 54 in abutment 6, and thereby fluid under pressure is supplied at the end of valve chamber 56 adjacent to said port 54 and against the piston valve 55, driving it to the opposite position in the valve chamber 56. Simultaneously with the last above stated connection of ports supplying fluid under pressure, the arm of the right angled port 44 that is parallel with the hollow piston shaft 20 connects with the slotted port 53 in the abutment 6, and the transverse arm of said right angled port 44 also connects with the interior end of the port 51. The port 51 being open to the air and being connected by the right angled port 44 with the slotted port 53, constitutes an exhaust so that the fluid under pressure in the valve chamber 55 adjacent to the slotted port 53 during the last formerly described movement of the wing piston X that has held the piston valve 55 in place, is permitted to escape, and the piston valve 55 as above stated is driven to the position shown in Fig. 9. When the piston valve is in the position shown in Fig. 9 and the wing piston X is in the position shown in Fig. 6, fluid under pressure being always supplied to port 46 and its connecting ports, port 46$^b$ is closed, and the grooved port 57 is in alinement with the port 46$^a$ and also in alinement with the port 48 through which the fluid under pressure is expended directly as stated in the former movement against the wing piston X driving it as indicated in the drawings from left to right. While the piston valve 55 is in last above position, the grooved port 58 thereof is in alinement with the port 47$^a$, and also in alinement with the port 50, which extends through the abutment 6 and casing of the cylinder to the open air, constituting a continuous exhaust, while the wing piston X is in motion from left to right. When the wing piston X has completed its movement from left to right and just as it reaches the abutment 6 in that movement, the rectangular slotted port 42 comes into alinement with the port 46$^c$, and at the same time in alinement with the slotted port 53 in the abutment 6, thereby admitting fluid under pressure through said connected ports into the end of the chamber 56 adjacent to the port 53, thereby driving said piston valve 55 to the opposite end of the chamber 56. Simultaneously with the last above described connection of ports supplying fluid under pressure, the arm of the right angled slotted port 43$^a$ that is parallel with the hollow piston shaft 20 is in alinement with the slotted port 54 of abutment 6, and the arm of said right angled port 43$^a$ that is transverse to said piston shaft 20 is in alinement with the port 52 which last port is connected with the port 52$^a$ extending through the abutment 6, casing and screw cap, to the open air, thus constituting an exhaust to the open air for the fluid under pressure in the end of the valve chamber 56 adjacent to the slotted port 54, so that the piston valve 55 will assume the position last above described. With this movement completed, the reverse movement occurs as herein before described.

The distinguishing feature of this mechanism is that upon the wing piston reaching either dead center point the throw of the piston valve is accomplished instantly by the direct application of fluid under pressure, and thereby the fluid under pressure is instantly and directly applied to the wing piston in full force while the exhaust on the opposite of the wing piston is free. This device is specially applicable where compactness is desired and where it is desired to expend the power upon a shaft included in and extending through the engine.

While oscillating engines are not new and I do not claim the oscillating feature broadly, I claim:—

1. In an oscillating engine of the character described, the combination of an alternating rotating wing piston with a hollow shaft in a containing cylinder and provided with means to attach to operating shaft, and an abutment interiorly fixed within said containing cylinder containing a system of ports connected with fluid under pressure and adapted to expend said fluid under pressure upon said wing valve, also containing a system of exhaust ports, a piston valve provided with annular ports disposed within said abutment and adapted to be operated automatically solely by fluid under pressure applied at the rear end of said piston valve from which the same is to be driven to connect operatively in alternation with said supply ports and said exhaust ports upon fluid under pressure being supplied, rectangular and right angled ports on said hollow shaft adapted to connect alternately with said piston valve and adapted to operate the same to reverse the discharge of fluid under pressure on said wing piston by use of said ports in said abutment, the whole adapted to be mounted upon and to operate a shaft centrally disposed in said device, all substantially as set forth.

2. In an oscillating engine of the character described, having a cylinder and a wing piston, an abutment attached to the interior of said cylinder containing a system of conduits adapted to be connected with a supply of fluid under pressure and containing a piston chamber, a circular grooved piston valve in said piston chamber, said abutment containing a system of admission conduits connected operatively by means of said grooved piston adapted to conduct the fluid under pressure alternately to either side of said abutment, said abutment also containing a system of exhaust conduits connected operatively by said piston valve to exhaust alternately from either side of said valve piece, a system of ports on said wing piston adapted automatically solely by direct application of fluid under pressure to the rear of said piston valve to reverse the same, substantially as set forth.

CASSIUS M. WALKER.

Witnesses:
ROBERT HENRY,
D. A. CALLAWAY.